(12) United States Patent
Hirano

(10) Patent No.: US 10,554,833 B2
(45) Date of Patent: Feb. 4, 2020

(54) PAPER CONVEYING DEVICE AND IMAGE FORMING APPARATUS

(71) Applicant: Konica Minolta, Inc., Chiyoda-ku, Tokyo (JP)

(72) Inventor: Yusuke Hirano, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/126,418

(22) Filed: Sep. 10, 2018

(65) Prior Publication Data

US 2019/0082068 A1    Mar. 14, 2019

(30) Foreign Application Priority Data

Sep. 11, 2017   (JP) .................................. 2017-174058

(51) Int. Cl.
| | |
|---|---|
| *H04N 1/00* | (2006.01) |
| *B65H 3/06* | (2006.01) |
| *B65H 5/06* | (2006.01) |
| *G03G 15/16* | (2006.01) |

(52) U.S. Cl.
CPC ....... *H04N 1/00602* (2013.01); *B65H 3/0669* (2013.01); *B65H 5/062* (2013.01); *G03G 15/1615* (2013.01)

(58) Field of Classification Search
CPC ........ B41J 13/0018; B41J 13/26; B41J 19/94; B41J 23/025; H04N 1/00602
USPC .......... 399/122, 121, 109, 124; 347/16, 104; 271/228, 265.01
See application file for complete search history.

(56) References Cited

U.S. PATENT DOCUMENTS

| | | | | |
|---|---|---|---|---|
| 5,710,587 A | * | 1/1998 | Suzuki ................. | B41J 11/0095 347/104 |
| 5,711,405 A | * | 1/1998 | Tamehira ............... | B41J 23/025 192/26 |
| 5,713,568 A | * | 2/1998 | Tamehira ............... | B41J 13/103 271/117 |
| 5,785,441 A | * | 7/1998 | Kobayashi ............. | B41J 13/106 347/104 |

(Continued)

FOREIGN PATENT DOCUMENTS

| | | |
|---|---|---|
| JP | 2005206338 A | 8/2005 |
| JP | 2011102184 A | 5/2011 |

OTHER PUBLICATIONS

SIPO First Office Action corresponding to Application No. 201811028493.4; dated Nov. 5, 2019.

*Primary Examiner* — Negussie Worku
(74) *Attorney, Agent, or Firm* — Cantor Colburn LLP

(57) ABSTRACT

A paper conveying device includes: a roller shaft having a first engaging portion and configured to rotate integrally with the first engaging portion; and a roller unit having a second engaging portion and provided on the roller shaft, the roller unit being configured to convey a sheet of paper as the roller unit rotates while being in contact with the sheet of paper. In an engaged state where the first engaging portion and the second engaging portion engage with each other, the roller unit is restricted from moving in an axis direction relative to the roller shaft. In a disengaged state where the first engaging portion and the second engaging portion disengage from each other, the roller unit is movable in the axis direction relative to the roller shaft.

20 Claims, 10 Drawing Sheets

(56) References Cited

U.S. PATENT DOCUMENTS

| | | | |
|---|---|---|---|
| 2004/0251589 A1* | 12/2004 | Satoh | B65H 5/062 |
| | | | 271/10.01 |
| 2005/0220517 A1* | 10/2005 | Matsushima | B41J 13/10 |
| | | | 399/388 |
| 2006/0008294 A1* | 1/2006 | Ito | G03G 21/1604 |
| | | | 399/122 |
| 2006/0165467 A1* | 7/2006 | Kawakami | B41J 3/4075 |
| | | | 400/613 |
| 2007/0146463 A1* | 6/2007 | Sasa | B41J 11/0065 |
| | | | 347/104 |
| 2009/0295079 A1 | 12/2009 | Kinoshita et al. | |
| 2013/0082440 A1* | 4/2013 | Fujiwara | B65H 3/042 |
| | | | 271/228 |
| 2014/0253713 A1* | 9/2014 | Zhai | H03K 21/38 |
| | | | 348/80 |
| 2015/0217964 A1* | 8/2015 | Kugimiya | B65H 45/18 |
| | | | 493/444 |
| 2017/0205751 A1* | 7/2017 | Hirano | G03G 15/6582 |

\* cited by examiner

PAPER CONVEYING DEVICE AND IMAGE FORMING APPARATUS

CROSS-REFERENCE TO RELATED APPLICATION

The present application claims priority under 35 U.S.C. § 119 to Japanese Patent Application No. 2017-174058, filed on Sep. 11, 2017, the entire contents of which are incorporated herein by reference.

BACKGROUND

Technological Field

The present invention relates to a paper conveying device and an image forming apparatus.

Description of the Related Art

An image forming apparatus such as a copying machine is required to convey sheets of paper while accurately controlling the position of the sheets of paper, the attitude of the sheets of paper, the timing of conveying the sheets of paper, and the like, which are generally implemented using a paper conveying device (also referred to as a paper registration device). By using the paper conveying device, for example, the position of the sheets of paper in the direction that is orthogonal to the conveying direction can be optimized, skew of the sheets of paper can be reduced, and the timing of conveyance can coincide with the timing of transfer.

Japanese Laid-Open Patent Publication No. 2005-206338 discloses the invention related to a paper conveying device. This paper conveying device includes displacement sensing means, a unit base portion, a support spring, and swinging means. The unit base portion is configured to support a conveying roller. The support spring is configured to bias the entire unit base portion in the direction that is orthogonal to the direction in which a recording material is conveyed. Based on the displacement amount of the recording material sensed by the displacement sensing means, the swinging amount of the swinging means is controlled. As the conveying means is swung in the direction orthogonal to the conveying direction of the recording material, the position of the recording material is adjusted. The above-mentioned document states that a high-definition image can be formed at a prescribed position at high speed by the above-mentioned configuration.

Japanese Laid-Open Patent Publication No. 2011-102184 discloses the invention related to a paper registration apparatus. This paper registration apparatus includes: first and second roller pairs, first and second roller-pair sideway moving mechanisms, a biasing member, a load applying member, and the like. The first roller pair is provided on the downstream side of a paper conveying path. The second roller pair is provided on the upstream side of the first roller pair. The first roller-pair sideway moving mechanism moves the first roller pair in the direction orthogonal to the paper conveying direction.

The biasing member (a spring) is configured to hold the second roller pair such that the second roller pair can be moved in the direction orthogonal to the paper conveying direction and also configured to bias the second roller pair such that the second roller pair is returned to the initial position when there is no sheet of paper. As a sheet of paper moves sideways in accordance with the sideway movement of the first roller pair, the second roller-pair sideway moving mechanism moves the second roller pair sideways in the state where the second roller pair holds the sheet of paper. The load applying member is provided immediately behind the second roller pair and configured to apply a load to the sheet of paper that is being conveyed. The above-mentioned document states that the above-mentioned configuration can reduce the damage to the sheet of paper.

SUMMARY

The paper conveying device disclosed in Japanese Laid-Open Patent Publication No. 2005-206338 includes a support spring, in which the support spring is used to move (swing) a sheet of paper in the direction that is orthogonal to the paper conveying direction. The same also applies to the paper registration apparatus disclosed in Japanese Laid-Open Patent Publication No. 2011-102184. The configuration of the paper conveying device that includes biasing means such as a support spring tends to complicate the entire apparatus.

The present invention aims to provide a paper conveying device capable of moving a sheet of paper in the direction orthogonal to a paper conveying direction by a simple configuration as compared with the conventional configuration, and an image forming apparatus including the paper conveying device.

To achieve at least one of the above-mentioned objects, according to an aspect of the present invention, a paper conveying device reflecting one aspect of the present invention comprises: a roller shaft having a first engaging portion and configured to rotate integrally with the first engaging portion; and a roller unit having a second engaging portion and provided on the roller shaft so as to surround the roller shaft in a circumferential direction of the roller shaft, the roller unit being configured to convey a sheet of paper as the roller unit rotates while being in contact with the sheet of paper fed onto a paper conveying path. The roller unit is configured to be restricted from moving in an axis direction relative to the roller shaft in an engaged state where the first engaging portion and the second engaging portion engage with each other. The roller unit is configured to be movable in the axis direction relative to the roller shaft in a disengaged state where the first engaging portion and the second engaging portion disengage from each other.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Embodiment (Image Forming Apparatus 100)

Figure 1:
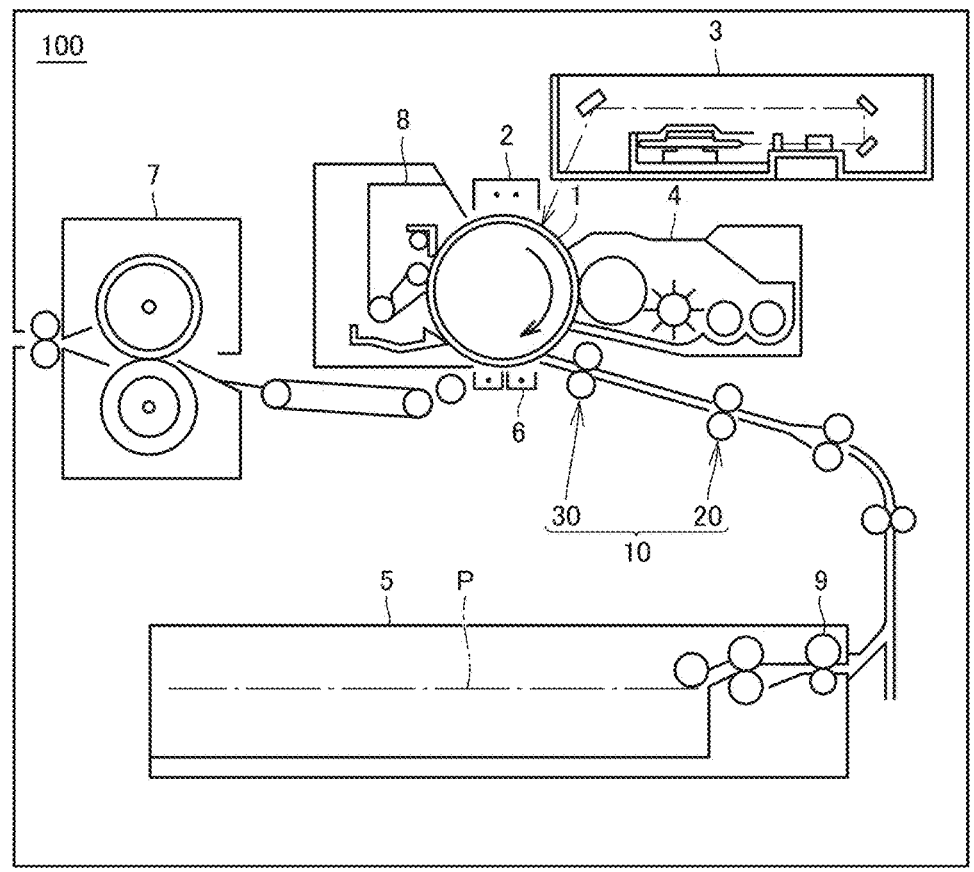
FIG. 1 is a diagram schematically showing an image forming apparatus 100 in the first embodiment.

FIG. 1 is a diagram schematically showing an image forming apparatus 100 in the first embodiment. Image forming apparatus 100 is configured to form an image on a sheet of paper P by an electrophotographic scheme. Image forming apparatus 100 includes a photoreceptor 1, a charging device 2, an exposure device 3, a developing device 4, a paper feeding device 5, a transferring device 6, a fixing device 7, a cleaning device 8, a paper feeding roller 9, and a paper conveying device 10.

Photoreceptor 1 has a surface that uniformly becomes charged by charging device 2. On the surface of photoreceptor 1, an electrostatic latent image is formed by exposure device 3. The electrostatic latent image is developed by developing device 4 to form a toner image. Sheet of paper P contained in paper feeding device 5 is fed through paper feeding roller 9 and paper conveying device 10 to transferring device 6 (a transfer unit). The toner image is transferred onto the surface of sheet of paper P by transferring device 6.

Sheet of paper P is then fed to fixing device 7. After the toner image is fixed onto sheet of paper P by fixing device 7, sheet of paper P is discharged to the outside of the apparatus. The toner remaining on photoreceptor 1 after transfer is removed from the surface of photoreceptor 1 by cleaning device 8. In the present embodiment, paper conveying device 10 is provided on a paper conveying path Q (FIG. 2) between paper feeding device 5 (paper feeding roller 9) and transferring device 6.

(Paper Conveying Device 10)

Figure 2:
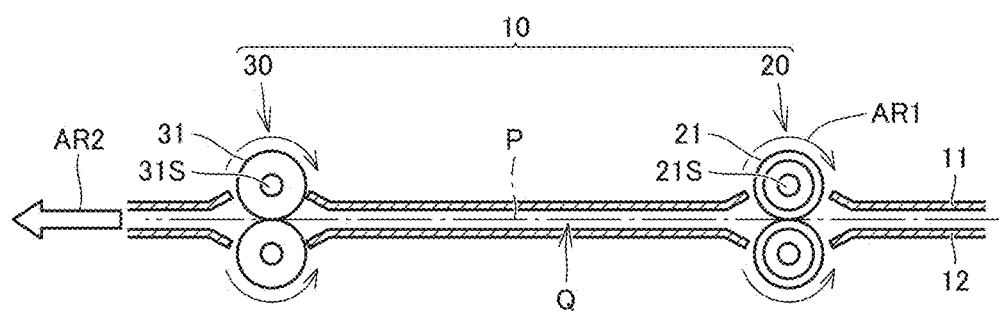
FIG. 2 is a cross-sectional view showing a paper conveying device 10 in the first embodiment, which shows a cross-sectional shape of paper conveying device 10 taken along a line II-II in FIG. 3.
Figure 3:
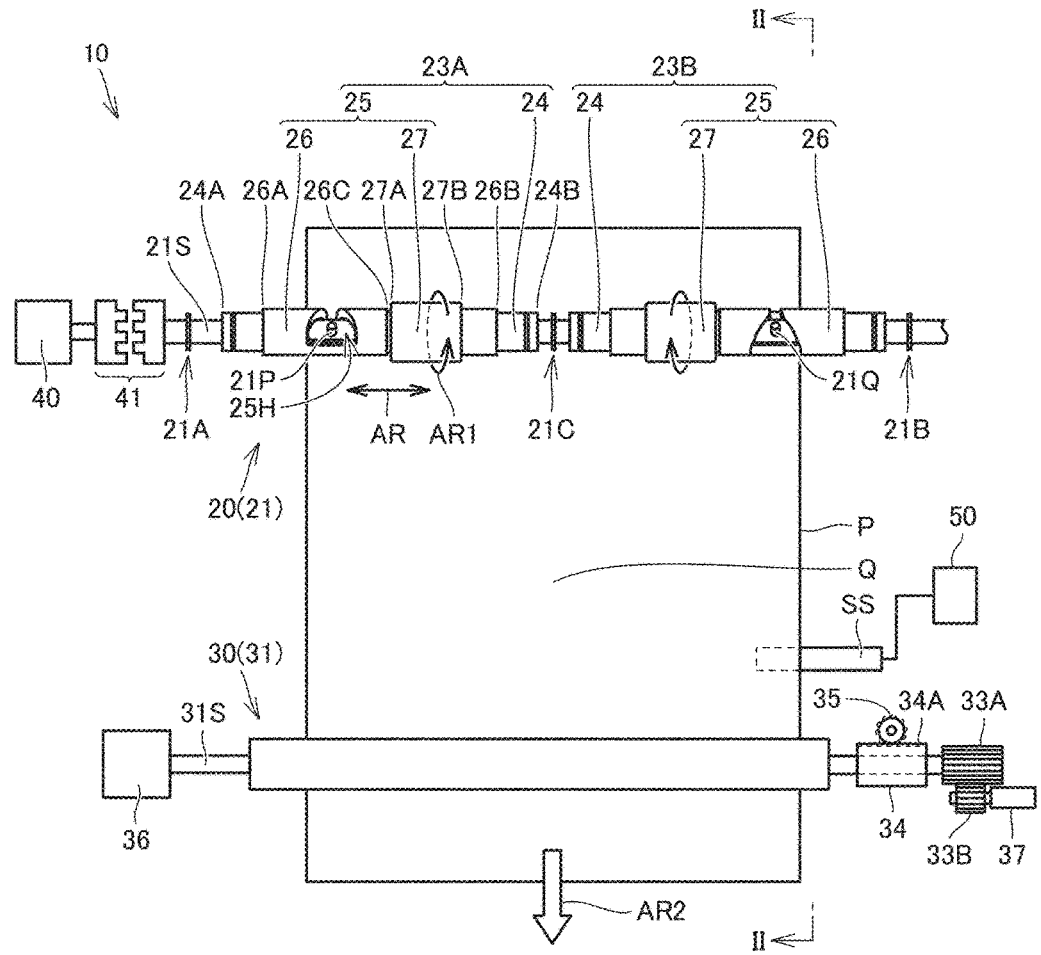
FIG. 3 is a plan view showing paper conveying device 10 in the first embodiment.

Referring to FIG. 2 to FIG. 8, paper conveying device 10 in the first embodiment will be hereinafter described. FIG. 2 is a cross-sectional view showing paper conveying device 10, which shows a cross-sectional shape of paper conveying device 10 taken along a line II-II in FIG. 3. FIG. 3 is a plan view showing paper conveying device 10. As shown in FIG. 1 to FIG. 3 (mainly FIG. 2 and FIG. 3), paper conveying device 10 includes a loop roller mechanism 20, a resist roller mechanism 30, a sensor SS, and a controller 50.

On paper conveying path Q, loop roller mechanism 20 is located on the side closer to paper feeding roller 9 (FIG. 1). Also on paper conveying path Q, resist roller mechanism 30 is located on the side closer to transferring device 6 (FIG. 1). Guides 11 and 12 are provided on each of the upstream and downstream sides of loop roller mechanism 20 and also provided on each of the upstream and downstream sides of resist roller mechanism 30. Paper conveying path Q is defined between guides 11 and 12.

(Resist Roller Mechanism 30)

As shown in FIG. 2, on paper conveying path Q, resist roller mechanism 30 is disposed on the downstream side of loop roller mechanism 20 (roller shaft 21S). Resist roller mechanism 30 includes a pair of upper and lower roller bodies 31 that have approximately the same configuration. Paper conveying path Q is defined between these roller bodies 31.

Roller shaft 31S of roller body 31 has one end that is rotatably supported by a bearing 36 (FIG. 3) and the other end that is provided with a gear 33A. Gear 33A engages with gear 33B and receives driving force from a motor 37 (a drive mechanism) through gear 33B. Each of paired roller bodies 31 is driven by this driving force to rotate in the paper conveying direction for conveying sheet of paper P (see FIG. 2).

Gear 33A has a prescribed length enough to allow gear 33A to receive the driving force from gear 33B even when resist roller mechanism 30 moves sideways in the axis direction. On a portion of roller shaft 31S located between gear 33A and roller body 31, a ring member 34 is fixed through a bearing (not shown). A rack 34A is formed on a surface of ring member 34.

A pinion 35 connected to a motor (not shown) engages with rack 34A of ring member 34. As pinion 35 rotates, resist roller mechanism 30 moves sideways in the axis direction of roller body 31. Ring member 34 is configured to allow rotation of resist roller mechanism 30 and to cause roller body 31 to move sideways in the axis direction. Ring member 34, rack 34A formed on ring member 34, and pinion 35 function as a swing mechanism to allow resist roller mechanism 30 to be moved in the direction orthogonal to the direction in which sheet of paper P is conveyed (an arrow AR2).

(Loop Roller Mechanism 20)

As shown in FIG. 2, loop roller mechanism 20 includes a pair of upper and lower roller bodies 21, between which paper conveying path Q is defined. These paired upper and lower roller bodies 21 have approximately the same configuration. Thus, specifically, the configuration of roller body 21 disposed on the upper side will be hereinafter described. As shown in FIG. 3, roller body 21 of loop roller mechanism 20 includes roller shaft 21S and roller units 23A, 23B.

Figure 4:
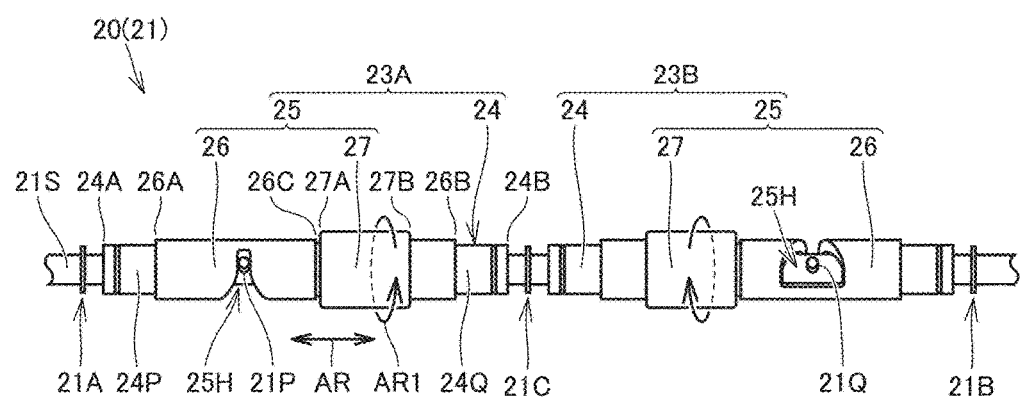
FIG. 4 is an enlarged plan view showing a roller shaft 21S, roller units 23A and 23B that are provided in paper conveying device 10 in the first embodiment.
Figure 5:
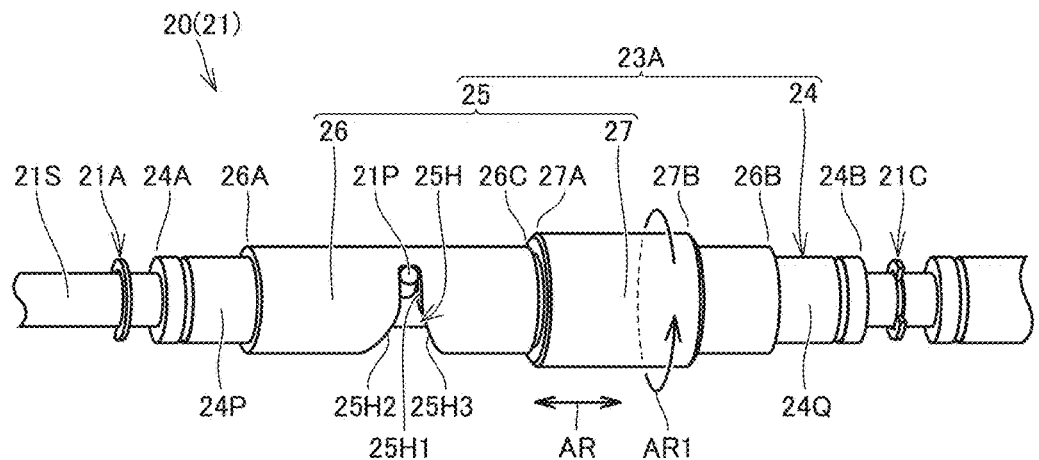
FIG. 5 is an enlarged perspective view showing roller unit 23A provided in paper conveying device 10 in the first embodiment, which shows the manner in which roller unit 23A is in the engaged state.
Figure 6:
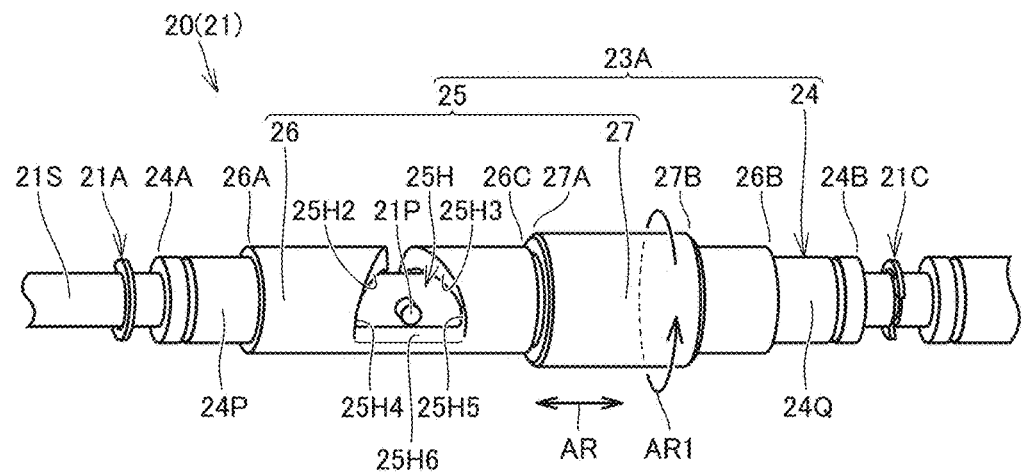
FIG. 6 is an enlarged perspective view showing roller unit 23A provided in paper conveying device 10 in the first embodiment, which shows the manner in which roller unit 23A is in the disengaged state.
Figure 7:
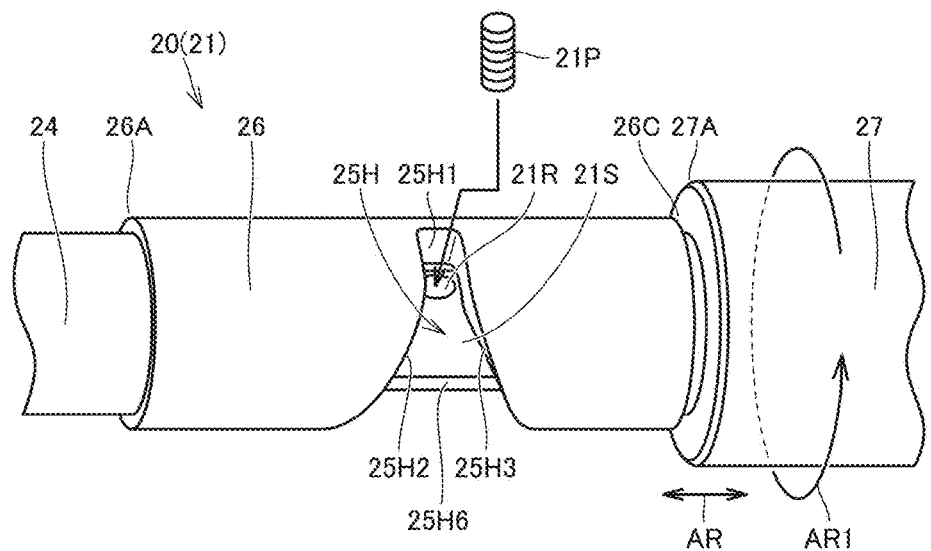
FIG. 7 is an enlarged perspective view showing roller shaft 21S, an engaging pin 21P (the first engaging portion) and the like provided in paper conveying device 10 in the first embodiment, which shows the manner in which engaging pin 21P is inserted into a screw hole 21R provided in roller shaft 21S.

FIG. 4 is an enlarged plan view showing roller shaft 21S and roller units 23A and 23B. FIG. 5 is an enlarged perspective view showing roller unit 23A, which shows the manner in which roller unit 23A is in the engaged state (described later). FIG. 6 is an enlarged perspective view showing roller unit 23A, which shows the manner in which roller unit 23A is in the disengaged state (described later). FIG. 7 is an enlarged perspective view of roller shaft 21S, an engaging pin 21P (the first engaging portion) and the like, which shows the manner in which engaging pin 21P is inserted into a screw hole 21R provided in roller shaft 21S.

(Roller Shaft 21S and First Engaging Portion)

As shown in FIG. 3 to FIG. 6, roller shaft 21S has a columnar shape extending in axis direction AR. Roller shaft 21S is made of metal, for example. Roller shaft 21S is provided with bearings (not shown) at its one end and other portions. Roller shaft 21S is rotatably supported by these bearings. The other end of roller body 21 is provided with a switching mechanism 41 (FIG. 3). Switching mechanism 41 is formed of a clutch, for example.

Switching mechanism 41 receives a control signal from controller 50 and the like to be switched between the connected state and the disconnected state. In the connected state, the driving force from driving source 40 (FIG. 3) such as a motor is transmitted to roller shaft 21S. Upon reception of the driving force from driving source 40, roller shaft 21S rotates in paper conveying direction AR1. In the disconnected state, the driving force from driving source 40 is not transmitted to roller shaft 21S. Roller shaft 21S is held by the bearing (not shown) so as to be rotatable.

Roller shaft 21S includes engaging pins 21P and 21Q (FIG. 3 and FIG. 4), and is configured to rotate integrally with engaging pins 21P and 21Q. Each of engaging pins 21P and 21Q has a shape protruding outward in the radial direction from the surface of roller shaft 21S such that each of engaging pins 21P and 21Q can function as the first engaging portion. Each of engaging pins 21P and 21Q is screwed, for example, into screw hole 21R (see FIG. 7) provided in roller shaft 21S, so that each of engaging pins 21P and 21Q is fixed to roller shaft 21S. Each of engaging pins 21P and 21Q may have a columnar shape, or may have a cylindrical shape.

Roller shaft 21S is also provided with flange portions 21A, 21B, and 21C. Flange portions 21A, 21B, and 21C are fixed to roller shaft 21S so as not to move in axis direction AR relative to roller shaft 21S. Roller unit 23A is disposed between flange portions 21A and 21C in axis direction AR. Roller unit 23B is disposed between flange portions 21C and 21B in axis direction AR.

Roller units 23A and 23B in the present embodiment are movable in axis direction AR relative to roller shaft 21S. Flange portions 21A and 21C define the movable range of roller unit 23A in axis direction AR. Flange portions 21C and 21B define the movable range of roller unit 23B in axis direction AR.

(Roller Unit 23A)

Mainly referring to FIG. 5 and FIG. 6, roller unit 23A has the second engaging portion (a concave portion 25H1), which will be described later. Roller unit 23A is provided on roller shaft 21S so as to surround roller shaft 21S in the circumferential direction of this roller shaft 21S. Roller unit 23A conveys sheet of paper P as roller unit 23A rotates while being in contact with sheet of paper P that is fed onto paper conveying path Q (specifically, while a conveying roller 27 (described later) is in contact with sheet of paper P).

Roller unit 23A in the present embodiment includes a linear bearing 24 and a roller member 25. Linear bearing 24 is disposed so as to surround roller shaft 21S in the circumferential direction of roller shaft 21S and so as to slide along roller shaft 21S. Linear bearing 24 includes a portion 24P located on the side of one end 24A in axis direction AR and a portion 24Q located on the side of the other end 24B in axis direction AR. From between portions 24P and 24Q, the surface of roller shaft 21S and engaging pin 21P are exposed (see FIG. 5 and FIG. 6).

Roller member 25 is formed in a cylindrical shape and disposed on the outer circumferential surface of linear bearing 24 so as to surround the outer circumferential surface of linear bearing 24 in the circumferential direction. Roller member 25 in the present embodiment includes a roller holding portion 26 and a conveying roller 27 that is provided on roller holding portion 26. Roller holding portion 26 is made of a resin, for example.

Roller holding portion 26 has a cylindrical shape extending from one end 26A to the other end 26B in axis direction AR. A leveled step 26C is provided between one end 26A and the other end 26B. Conveying roller 27 is provided on a portion of the outer circumferential surface of roller holding portion 26 that is located between leveled step 26C and the other end 26B. Conveying roller 27 is made of a resin, for example, and formed in a cylindrical shape extending from one end 27A to the other end 27B in axis direction AR.

The above-described portion 24P of linear bearing 24 is disposed on a portion on the inner circumferential surface of roller holding portion 26 that is located between one end 26A and leveled step 26C. The above-described portion 24Q of linear bearing 24 is disposed on a portion on the inner circumferential surface of roller holding portion 26 that is located between the other end 26B and leveled step 26C.

Roller holding portion 26 is supported by linear bearing 24 as described above, so that roller holding portion 26 is not in contact with the surface of roller shaft 21S. Roller member 25 (that is, roller holding portion 26 and conveying roller 27) rotate integrally with linear bearing 24 while conveying roller 27 is in contact with sheet of paper P.

Figure 8:
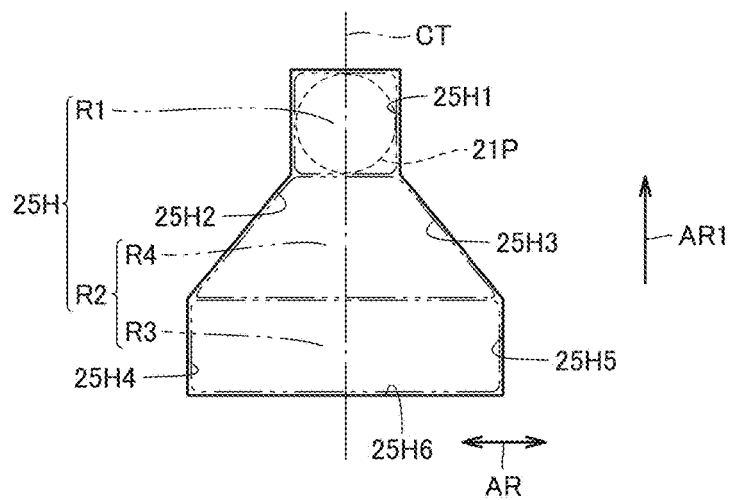
FIG. 8 is a diagram schematically showing a hole portion 25H provided in a roller holding portion 26 in the first embodiment (showing hole portion 25H developed in a paper conveying direction AR1).

A portion of roller holding portion 26 that is located between leveled step 26C and one end 26A is provided with a hole portion 25H that penetrates through roller holding portion 26 in the radial direction. Engaging pin 21P provided in roller shaft 21S is disposed inside hole portion 25H. FIG. 8 is a diagram schematically showing hole portion 25H provided in roller holding portion 26 (showing hole portion 25H developed in paper conveying direction AR1).

(Hole Portion 25H and Second Engaging Portion)

Hole portion 25H has a shape that is bilaterally symmetrical with respect to a central axis CT located inside hole portion 25H and extending in the direction orthogonal to axis direction AR. Hole portion 25H in the present embodiment has a restriction portion R1 and a release portion R2. Release portion R2 is disposed adjacent to restriction portion R1 in paper conveying direction AR1 (in the circumferential direction). Restriction portion R1 is located on the front side in paper conveying direction AR1. Release portion R2 is located on the rear side of restriction portion R1 in paper conveying direction AR1. Release portion R2 is formed to be greater in opening width in axis direction AR than restriction portion R1.

As shown in FIG. 8, the inner wall surface of roller holding portion 26 that forms hole portion 25H includes a concave portion 25H1, side wall portions 25H2, 25H3, 25H4, and 25H5, and a bottom portion 25H6. Concave portion 25H1 is located in hole portion 25H on the foremost side in paper conveying direction AR1. The concave space formed inside concave portion 25H1 is slightly larger than engaging pin 21P. The concave space formed inside concave portion 25H1 constitutes restriction portion R1 of hole portion 25H.

Side wall portions 25H2 and 25H4 are located inside hole portion 25H on one side in axis direction AR. Side wall portions 25H3 and 25H5 are located inside hole portion 25H on the other side in axis direction AR. Side wall portion 25H2 is located between side wall portion 25H4 and concave portion 25H1. Side wall portion 25H3 is located between side wall portion 25H5 and concave portion 25H1. Side wall portions 25H4 and 25H5 establish the positional relation so as to face each other in axis direction AR. Bottom portion 25H6 is located in hole portion 25H on the rearmost side in paper conveying direction AR1. Bottom portion 25H6 extends in axis direction AR so as to connect side wall portions 25H4 and 25H5.

The space formed inside side wall portions 25H2, 25H3, 25H4, 25H5 and bottom portion 25H6 is sufficiently larger than engaging pin 21P. The space formed inside these portions constitute release portion R2 in hole portion 25H. Release portion R2 in the present embodiment includes a wide-width portion R3 and a tapered portion R4. Tapered portion R4 is formed between wide-width portion R3 and restriction portion R1 in the circumferential direction (in paper conveying direction AR1). Tapered portion R4 is formed such that the opening width of tapered portion R4 in axis direction AR is gradually narrowed from wide-width portion R3 toward restriction portion R1.

In the present embodiment, side wall portion 25H2 (the first portion), which is included in the inner wall that forms tapered portion R4 of hole portion 25H and located on one side in axis direction AR, is not perpendicular to axis direction AR. Side wall portion 25H3 (the second portion), which is included in the inner wall that forms tapered portion R4 of hole portion 25H and located on the other side in axis direction AR, is also not perpendicular to axis direction AR. Side wall portions 25H2 and 25H3 extend so as to be gradually closer to each other from wide-width portion R3 toward restriction portion R1.

(Engaged State)

Engaging pin 21P (the first engaging portion) provided in roller shaft 21S is disposed inside concave portion 25H1 (the second engaging portion) (that is, inside restriction portion R1), so that roller unit 23A is brought into the engaged state. In the engaged state (in the state shown in FIG. 5), engaging pin 21P and concave portion 25H1 (hole portion 25H) engage with each other in axis direction AR. When roller unit 23A is in the engaged state, roller unit 23A is restricted from moving in axis direction AR relative to roller shaft 21S.

In the present embodiment, as described above, roller unit 23A is provided on roller shaft 21S so as to be rotatable relative to roller shaft 21S. When roller unit 23A is in the engaged state (in the state shown in FIG. 5), roller unit 23A can rotate in paper conveying direction AR1 relative to roller shaft 21S, and also, engaging pin 21P is in contact with the inner wall of concave portion 25H1. Thereby, roller unit 23A is restricted from rotating in the opposite direction to paper conveying direction AR1 relative to roller shaft 21S.

As described above, when switching mechanism 41 (FIG. 3) is in the connected state, roller shaft 21S can rotate in paper conveying direction AR1 as roller shaft 21S receives the driving force acting in the direction rotating in paper conveying direction AR1 from driving source 40 that is drive-connected to roller shaft 21S. When roller shaft 21S receives the driving force from driving source 40, engaging pin 21P (the first engaging portion) and concave portion 25H1 (the second engaging portion) come into contact with each other. Then, by engaging pin 21P, the rotating force in paper conveying direction AR1 is applied to concave portion 25H1. Consequently, while roller shaft 21S is rotating integrally with roller unit 23A, roller unit 23A is brought into the engaged state.

(Disengaged State)

Engaging pin 21P (the first engaging portion) provided in roller shaft 21S is disposed inside release portion R2 (at the position between side wall portions 25H2 and 25H3 or the position between side wall portions 25H4 and 25H5), so that roller unit 23A is brought into the disengaged state. In the disengaged state (in the state shown in FIG. 6), engaging pin 21P and hole portion 25H (concave portion 25H1) do not engage with each other in axis direction AR. When roller unit 23A is in the disengaged state, it can move in axis direction AR relative to roller shaft 21S.

When roller unit 23A is in the disengaged state (in the state shown in FIG. 6), engaging pin 21P and concave portion 25H1 are spaced apart from each other in paper conveying direction AR1. Accordingly, roller unit 23A can rotate in the opposite direction to paper conveying direction AR1 at least relative to roller shaft 21S. When roller unit 23A is in the disengaged state where engaging pin 21P is not in contact with bottom portion 25H6 (for example, when engaging pin 21P is disposed inside tapered portion R4), roller unit 23A can rotate relative to roller shaft 21S not only in the opposite direction to paper conveying direction AR1 but also in paper conveying direction AR1.

In the present embodiment, when roller unit 23A rotates in paper conveying direction AR1 relative to roller shaft 21S in the state where roller unit 23A is in the engaged state (FIG. 5), engaging pin 21P (the first engaging portion) and concave portion 25H1 (the second engaging portion) are separated away from each other. Thereby, roller unit 23A is brought into the disengaged state.

On the other hand, when roller unit 23A rotates in the opposite direction to paper conveying direction AR1 relative to roller shaft 21S in the state where roller unit 23A is in the disengaged state (FIG. 6), engaging pin 21P (the first engaging portion) and the inner wall of concave portion 25H1 (the second engaging portion) come into contact with each other. Thereby, roller unit 23A is brought into the engaged state.

When switching mechanism 41 (FIG. 3) is in the disconnected state, roller shaft 21S does not receive the driving force from driving source 40. Roller shaft 21S is rotatably held by the bearing. Sheet of paper P is conveyed by the conveying force from resist roller mechanism 30 (FIG. 1) that is disposed on the downstream side of loop roller mechanism 20. While roller unit 23A (conveying roller 27) is in contact with sheet of paper P that is being conveyed, roller unit 23A is rotated in paper conveying direction AR1 relative to roller shaft 21S upon reception of the shear force from sheet of paper P. In this case, roller shaft 21S does not receive the driving force from driving source 40. Accordingly, concave portion 25H1 (the second engaging portion) moves in the direction away from engaging pin 21P (the first engaging portion), so that roller unit 23A is brought into the disengaged state.

(Roller Unit 23B)

Again referring to FIG. 3 and FIG. 4, roller unit 23B is approximately identical in configuration to roller unit 23A. Roller unit 23B in the present embodiment has a shape that is bilaterally symmetrical with respect to the position of flange portion 21C. In other words, roller units 23A and 23B each have a shape that is plane-symmetrical to each other with respect to a flat plane orthogonal to axis direction AR and passing through the position of flange portion 21C. The mechanism in which engaging pin 21P acts on roller unit 23A is the same as the mechanism in which engaging pin 21Q acts on roller unit 23B.

In the present embodiment, a plurality of (in this case, two) roller units 23A and 23B are provided on roller shaft 21S. However, three or more roller units may be provided on roller shaft 21S. Roller units 23A and 23B can rotate relative to roller shaft 21S independently from each other, and can be in independent phase with each other. When each of roller units 23A and 23B is in the disengaged state, roller units 23A and 23B can rotate in axis direction AR relative to roller shaft 21S independently from each other.

In the present embodiment, roller unit 23A (roller body 21) is not provided with the mechanism in which roller unit 23A is moved in the direction away from sheet of paper P disposed on paper conveying path Q, so that the device configuration is simplified. The pair of upper and lower roller units 23A (conveying rollers 27) (see FIG. 2) constituting loop roller mechanism 20 is continuously in contact with sheet of paper P while sheet of paper P is passing through between these paired roller units 23A.

The same also applies to roller unit 23B. Roller unit 23B (roller body 21) is not provided with the mechanism in which roller unit 23B is moved in the direction away from sheet of paper P disposed on paper conveying path Q, so that the device configuration is simplified. The pair of upper and lower roller units 23B (conveying rollers 27) (see FIG. 2) constituting loop roller mechanism 20 is continuously in contact with sheet of paper P while sheet of paper P is passing through between these paired roller units 23B.

The same also applies to a pair of upper and lower roller bodies 31 constituting resist roller mechanism 30. Resist roller mechanism 30 is not provided with the mechanism in which the pair of upper and lower roller bodies 31 are moved in the direction away from sheet of paper P disposed on paper conveying path Q, so that the device configuration is simplified. The pair of upper and lower roller bodies 31 (see FIG. 2) constituting resist roller mechanism 30 is continuously in contact with sheet of paper P while sheet of paper P is passing through between these paired roller bodies 31.

(Sensor SS and Controller 50)

Again referring to FIG. 3, sensor SS is positioned on the upstream side of resist roller mechanism 30 on paper conveying path Q and configured to sense the displacement amount (which is also referred to as a sideway displacement amount) of sheet of paper P disposed on paper conveying path Q. Sensor SS is formed of a CCD line sensor and the like and configured to transmit a signal about the displacement amount to controller 50.

Based on the displacement amount of sheet of paper P sensed by sensor SS, controller 50 drives the swing mechanism (the above-mentioned ring member 34, pinion 35 and the like), thereby causing resist roller mechanism 30 to be moved in the direction orthogonal to the direction in which sheet of paper P is conveyed (arrow AR2).

(Functions and Effects)

Referring to FIG. 3, sheet of paper P having been conveyed along paper conveying path Q reaches loop roller mechanism 20. In this case, switching mechanism 41 connect driving source 40 and roller shaft 21S (in the connected state), and driving source 40 causes roller shaft 21S to rotate in paper conveying direction AR1. Engaging pins 21P and 21Q (the first engaging portions) are disposed inside their respective concave portions 25H1 (the second engaging portions) of roller units 23A and 23B, respectively, thereby forming the engaged state. Roller units 23A and 23B rotate integrally with roller shaft 21S in the state where roller units 23A and 23B are restricted from moving in axis direction AR relative to roller shaft 21S.

Sheet of paper P having been conveyed along paper conveying path Q passes through a nip portion of loop roller mechanism 20. Then, the edge of sheet of paper P is brought into contact with the nip portion of resist roller mechanism 30 that is stopped. Movement of the edge of sheet of paper P is stopped at the nip portion. When the edge of sheet of paper P is aligned with the nip portion, the skew of sheet of paper P is corrected (skew registration). In this case, loop roller mechanism 20 on the upstream side is kept rotating. A loop of sheet of paper P is formed between loop roller mechanism 20 and resist roller mechanism 30.

Then, resist roller mechanism 30 starts to rotate such that the timing of conveyance of sheet of paper P and the timing of the image formed on photoreceptor 1 (FIG. 1) (the timing of transfer) coincide with each other (vertical registration). Sheet of paper P starts to move in the state where the skew at the edge of sheet of paper P is corrected. At the timing when sheet of paper P is moved by a prescribed distance from resist roller mechanism 30, sensor SS senses the displacement amount of sheet of paper P.

Pinion 35 is driven to rotate based on the displacement amount sensed by sensor SS. Each roller body 31 of resist roller mechanism 30 is moved in the direction in which the displacement amount of sheet of paper P is corrected. By movement of each roller body 31, sheet of paper P is also moved in the direction in which the displacement amount is corrected. The force generated in resist roller mechanism 30 (on the downstream side) and acting to move sheet of paper P (the force acting to move sheet of paper P in the direction in which the displacement amount of sheet of paper P is corrected) is transmitted to loop roller mechanism 20 on the upstream side due to the rigidity (elasticity) of sheet of paper P.

In loop roller mechanism 20, before the timing when each roller body 31 of resist roller mechanism 30 moves in the direction in which the displacement amount of sheet of paper P is corrected, switching mechanism 41 is switched from the connected state to the disconnected state. Thus, roller shaft 21S is separated from driving source 40. Roller shaft 21S is rotatably supported. While rotation of roller shaft 21S is stopped, roller units 23A and 23B are rotated by conveyance of sheet of paper P. When concave portions 25H1 are separated from engaging pins 21P and 21Q, roller units 23A and 23B each are changed from the engaged state to the disengaged state. Roller units 23A and 23B are in the state where roller units 23A and 23B can be moved in axis direction AR (that is, in the disengaged state).

The force generated in resist roller mechanism 30 (on the downstream side) and acting to move sheet of paper P (the force acting to move sheet of paper P in the direction in which the displacement amount of sheet of paper P is corrected) is transmitted to loop roller mechanism 20 on the upstream side due to the rigidity (elasticity) of sheet of paper P. Due to this force, roller units 23A and 23B (in the disengaged state) are also moved in the direction in which the displacement amount of sheet of paper P is corrected (horizontal registration).

In this case, unlike Japanese Laid-Open Patent Publication No. 2005-206338 and Japanese Laid-Open Patent Publication No. 2011-102184 mentioned at the beginning of this specification, the biasing force caused by a spring and the like is not applied to roller units 23A and 23B. Accordingly, without having to resist the biasing force caused by a spring and the like, roller units 23A and 23B can be moved rapidly and readily in the direction in which the displacement amount of sheet of paper P is corrected.

When sheet of paper P is further moved, engaging pins 21P and 21Q are brought into contact with bottom portion 25H6 (see FIG. 8) that constitutes hole portion 25H. Bottom portion 25H6 rotates integrally with conveying roller 27 (roller units 23A and 23B), to thereby cause roller shaft 21S to rotate in paper conveying direction AR1 through engaging pins 21P and 21Q. Roller shaft 21S is rotatable since it is disconnected from driving source 40. Thus, roller shaft 21S rotates integrally with engaging pins 21P and 21Q and roller units 23A and 23B.

Sheet of paper P is further moved and the rear edge of sheet of paper P passes through the nip portion of loop roller mechanism 20. Then, driving source 40 and roller shaft 21S are connected by switching mechanism 41 (the connected state). As roller shaft 21S rotates in paper conveying direction AR1, engaging pins 21P and 21Q (the first engaging portions) engage with their respective concave portions 25H1 (the second engaging portions) of roller units 23A and 23B, respectively, thereby forming the engaged state. Then, loop roller mechanism 20 can be ready for conveyance of the subsequent sheet of paper P.

(Conclusion)

According to the above-described paper conveying device 10, biasing force caused by a spring and the like is not applied to roller units 23A and 23B, unlike Japanese Laid-Open Patent Publication No. 2005-206338 and Japanese Laid-Open Patent Publication No. 2011-102184, which are mentioned at the beginning of this specification. Without having to resist the biasing force caused by a spring and the like, roller units 23A and 23B can be moved rapidly and readily with high followability and high conveyance accuracy in the direction in which the displacement amount of sheet of paper P is corrected. There is also no need to separately provide driving means for moving roller units 23A and 23B, so that cost and space reduction can be achieved. Thus, in a simple configuration as compared with the conventional case, paper conveying device 10 and image forming apparatus 100 allow sheet of paper P to be moved in the direction orthogonal to the conveying direction of this sheet of paper P.

In the present embodiment, roller unit 23A (roller body 21) is not provided with the mechanism in which roller unit 23A is moved in the direction away from sheet of paper P disposed on paper conveying path Q. Also in this aspect, the device configuration is simplified. The above-described configuration is not indispensable but is advantageous because a cost increase, an increase in size of the apparatus and generation of noise can be suppressed. The pair of upper and lower roller units 23A (conveying rollers 27) constituting loop roller mechanism 20 are continuously in contact with sheet of paper P while sheet of paper P is passing through between paired roller units 23A. The same also applies to roller unit 23B.

If sheet of paper P is kept held by roller units 23A and 23B when the force acting to move sheet of paper P (the force acting to move sheet of paper P in the direction in which the displacement amount of sheet of paper P is corrected) is produced by resist roller mechanism 30 (on the downstream side), skew may increase and the sheet of paper may be damaged. In contrast, in the present embodiment, loop roller mechanism 20 can move sheet of paper P rapidly and readily in the direction orthogonal to the conveying direction of sheet of paper P, so that skew increase and damage to the sheet of paper are effectively suppressed.

In paper conveying device 10, roller units 23A and 23B are rotatable relative to roller shaft 21S. Without having to resist the biasing force caused by a spring and the like, roller units 23A and 23B can be moved rapidly and readily with high followability and high conveyance accuracy in the direction in which the displacement amount of sheet of paper P is corrected. The above-described functions and effects can be achieved as long as roller units 23A and 23B are movable in axis direction AR relative to roller shaft 21S. Roller units 23A and 23B however do not necessarily have to be rotatable relative to roller shaft 21S. When roller units 23A and 23B are rotatable relative to roller shaft 21S, it is advantageous that the engaged state and the disengaged state in each of roller units 23A and 23B can be switched in accordance with rotation of roller units 23A and 23B relative to roller shaft 21S, as described above.

In paper conveying device 10, in accordance with rotation of roller units 23A and 23B relative to roller shaft 21S, the engaged state is changed to the disengaged state or the disengaged state is changed to the engaged state. Such state changes do not necessarily have to be implemented by relative rotation, but may be implemented using an electrically control-driven actuator and the like. Also by such a configuration, without having to resist the biasing force caused by a spring and the like, roller units 23A and 23B can be moved rapidly and readily with high followability and high conveyance accuracy in the direction in which the displacement amount of sheet of paper P is corrected. By a configuration that is simpler than the conventional configuration due to not using a spring, sheet of paper P can be moved in the direction orthogonal to the conveying direction of this sheet of paper P.

In paper conveying device 10, roller shaft 21S can be rotated by the driving force received from driving source 40 that is drive-connected to roller shaft 21S. When roller shaft 21S receives the driving force from driving source 40, roller units 23A and 23B each are in the engaged state. When roller shaft 21S does not receive the driving force from driving source 40, roller units 23A and 23B each are in the disengaged state. Without being limited to such a configuration, the engaged state and the disengaged state may be switched irrespective of whether the driving force from driving source 40 is transmitted to roller shaft 21S or not. For example, the engaged state and the disengaged state may be switched by using an electrically control-driven actuator and the like. Also by such a configuration, without having to resist the biasing force caused by a spring and the like, roller units 23A and 23B can be moved rapidly and readily with high followability and high conveyance accuracy in the direction in which the displacement amount of sheet of paper P is corrected. By a configuration that is simpler than the conventional configuration due to not using a spring, sheet of paper P can be moved in the direction orthogonal to the conveying direction of this sheet of paper P.

In paper conveying device 10, switching mechanism 41 serves to switch the connection state between: the connected state in which the driving force is transmitted from driving source 40 to roller shaft 21S; and the disconnected state in which the driving force is not transmitted from driving source 40 to roller shaft 21S. Switching mechanism 41 is not an indispensable configuration, but roller shaft 21S may be always connected to driving source 40. In this case, a load is larger than that in the case where driving source 40 and roller shaft 21S are disconnected by switching mechanism 41. However, by the conveying force applied by resist roller mechanism 30 to sheet of paper P, roller shaft 21S coupled to driving source 40 can be rotated integrally with roller units 23A and 23B. Also by the above-described configuration that is simpler than the conventional configuration, it becomes possible to achieve the above-described similar functions and effects that sheet of paper P can be moved in the direction orthogonal to the conveying direction of this sheet of paper P.

In paper conveying device 10, each of roller units 23A and 23B includes linear bearing 24 and roller member 25. Although the above-described configuration is not indispensable, roller member 25 (for example, made of a resin) that is used for conveyance of sheet of paper P is configured so as not to be in direct contact with roller shaft 21S, and only linear bearing 24 (for example, made of metal) among members in each of roller units 23A and 23B is allowed to be in direct contact with roller shaft 21S, so that lower sliding resistance is achieved. The member forming conveying roller 27 in roller member 25 is made of a resin, so that excellent conveyance performance for sheet of paper P can be achieved. The member forming linear bearing 24 is made of metal, so that excellent sliding performance of linear bearing 24 along roller shaft 21S can be achieved. Thus, roller units 23A and 23B can be moved further more rapidly and readily with further higher followability and higher conveyance accuracy in the direction in which the displacement amount of sheet of paper P is corrected.

In paper conveying device 10, engaging pins 21P and 21Q (the first engaging portions) each have a shape protruding from the surface of roller shaft 21S. Roller holding portion 26 in each of roller units 23A and 23B is provided with hole portion 25H. Engaging pins 21P and 21Q each have a cylindrical shape or a columnar shape. Engaging pins 21P and 21Q are disposed inside their respective hole portions 25H in roller holding portions 26 of roller units 23A and 23B, respectively. Concave portion 25H1 (the second engaging portion) is provided in a part of the inner wall forming hole portion 25H in roller holding portion 26. Engaging pins 21P and 21Q each are screwed into screw hole 21R provided in roller shaft 21S, so that engaging pins 21P and 21Q each can be readily fixed to roller shaft 21S. Engaging pins 21P and 21Q each have a cylindrical shape or a columnar shape, so that engaging pins 21P and 21Q each can be smoothly moved into and out of concave portion 25H1 (restriction portion R1). Without being limited to such a configuration, engaging pins 21P and 21Q each may have a prismatic shape. Roller holding portion 26 in each of roller units 23A and 23B may be provided, for example, with a pin as the first engaging portion. Roller shaft 21S may be provided with a hole portion that constitutes the second engaging portion. Also by such a configuration, the functions and effects approximately similar to those in the above-described embodiment can be achieved.

Again referring to FIG. 8, in paper conveying device 10, side wall portion 25H2 (the first portion), which is included in the inner wall forming tapered portion R4 of hole portion 25H and located on one side in axis direction AR, is not perpendicular to axis direction AR. Also, side wall portion 25143 (the second portion), which is included in the inner wall forming tapered portion R4 of hole portion 25H and located on the other side in axis direction AR, is also not perpendicular to axis direction AR. The above-described configuration is not indispensable. However, according to the above-described configuration, even when engaging pin 21P is disposed at the position near side wall portion 25H2, and even when engaging pin 21P is disposed at the position near side wall portion 25H3, due to the shapes of the inclined surfaces of side wall portions 25H2 and 25H3, engaging pin 21P can be readily moved from wide-width portion R3 (release portion R2) toward restriction portion R1. The same also applies to engaging pin 21Q.

In paper conveying device 10, a plurality of (in this case, two) roller units 23A and 23B are disposed on roller shaft S21. Roller units 23A and 23B can be rotated relative to roller shaft 21S independently from each other, and can be in independent phase with each other. According to the above-described configuration, the optimal relative rotation amount for roller unit 23A can be defined while the optimal relative rotation amount for roller unit 23B can be defined. Even when a twist occurs in sheet of paper P during skew correction, this twist can be effectively reduced.

In paper conveying device 10, when each of roller units 23A and 23B is in the disengaged state, roller units 23A and 23B can rotate in axis direction AR relative to roller shaft 21S independently from each other. According to the above-described configuration, the optimal amount of movement of roller unit 23A in axis direction AR can be defined while the optimal amount of movement of roller unit 23B in axis direction AR can be defined.

In paper conveying device 10, release portion R2 of hole portion 25H includes: wide-width portion R3; and tapered portion R4 that is formed between wide-width portion R3 and restriction portion R1 in the circumferential direction. Tapered portion R4 is shaped such that the opening width of tapered portion R4 in axis direction AR is gradually narrowed from wide-width portion R3 toward restriction portion R1. The above-described configuration facilitates movement of engaging pins 21P and 21Q from wide-width portion R3 (release portion R2) toward restriction portion R1, so that roller units 23A and 23B each can be readily switched from the disengaged state to the engaged state. Without being limited to the above-described configurations, it is not indispensable that hole portion 25H has tapered portion R4.

(First Modification)

Figure 9:
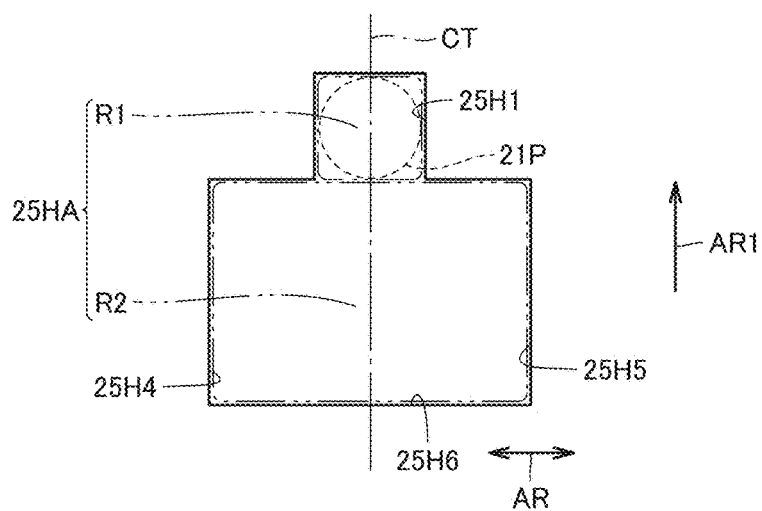
FIG. 9 is a diagram schematically showing a hole portion 25HA provided in a roller holding portion 26 in the first modification of the first embodiment (showing hole portion 25HA developed in paper conveying direction AR1).

As shown in FIG. 9, for example, hole portion 25HA includes a restriction portion R1 and a release portion R2. Side wall portions 25H2 and 25H3 (FIG. 8) in the first embodiment are not included in the inner wall forming hole portion 25HA in each of roller units 23A and 23B. According to the above-described configuration, engaging pins 21P and 21Q are less likely to move from release portion R2 toward restriction portion R1 as compared with the first embodiment. However, also by such a configuration, without having to resist the biasing force caused by a spring and the like, roller units 23A and 23B each can be moved rapidly and readily with high followability and high conveyance accuracy in the direction in which the displacement amount of sheet of paper P is corrected. By a configuration that is simpler than the conventional configuration due to not using a spring, sheet of paper P can be moved in the direction orthogonal to the conveying direction of this sheet of paper P.

(Second Modification)

Figure 10:
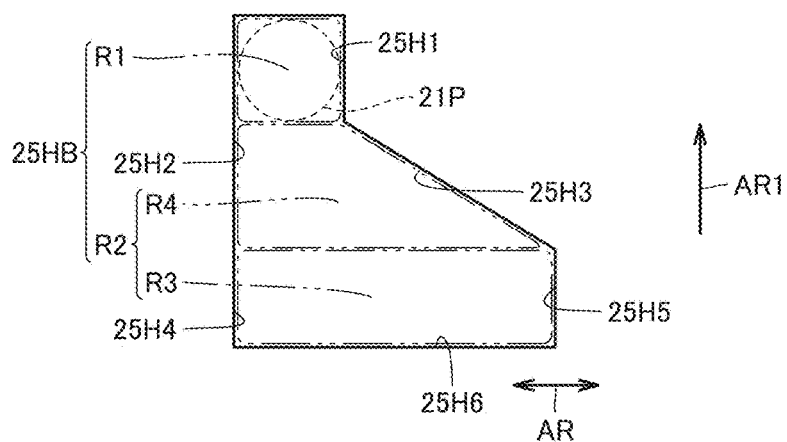
FIG. 10 is a diagram schematically showing a hole portion 25HB provided in a roller holding portion 26 in the second modification of the first embodiment (showing hole portion 25HB developed in paper conveying direction AR1).

Like hole portion 25HB shown in FIG. 10, side wall portion 25H2 forming tapered portion R4 may be perpendicular to axis direction AR. Side wall portion 25H2 is located on one side of hole portion 25HB in axis direction AR. In other words, side wall portion 25H2 (the first portion), which is included in the inner wall forming tapered portion R4 of hole portion 25HB and located on one side in axis direction AR, is perpendicular to axis direction AR. Also, side wall portion 25H3 (the second portion), which is included in the inner wall forming tapered portion R4 of hole portion 25HB and located on the other side in axis direction AR, is not perpendicular to axis direction AR. Hole portion 25HB has a shape that is bilaterally asymmetrical with respect to the central axis (see central axis CT in FIG. 9) located inside hole portion 25HB and extending in the direction orthogonal to axis direction AR.

Side wall portions 25H2 and 25H4 do not contribute to the movement of each of roller units 23A and 23B in axis direction AR relative to roller shaft 21S. This relative movement can be implemented mainly by side wall portion 25H3. The above-described configuration may be employed when the relative movement needs to have specific directionality. Also by the above-described configuration, engaging pins 21P and 21Q can be readily moved from wide-width portion R3 (release portion R2) toward restriction portion R1 with the help of side wall portion 25H3 and the like, so that roller units 23A and 23B can be readily switched from the disengaged state to the engaged state.

(Third Modification)

Figure 11:
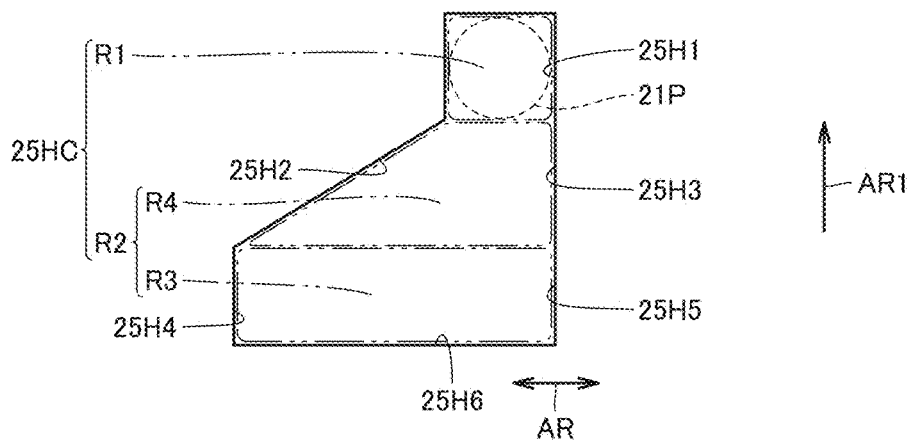
FIG. 11 is a diagram schematically showing a hole portion 25HC provided in a roller holding portion 26 in the third modification of the first embodiment (showing hole portion 25HC developed in paper conveying direction AR1).

Like hole portion 25HC shown in FIG. 11, side wall portion 25H3 forming tapered portion R4 may be perpendicular to axis direction AR. Side wall portion 25H3 is located on the other side of hole portion 25HC in axis direction AR. In other words, side wall portion 25H2 (the first portion), which is included in the inner wall forming tapered portion R4 of hole portion 25HC and located on one side in axis direction AR, is not perpendicular to axis direction AR. Also, side wall portion 25H3 (the second portion), which is included in the inner wall forming tapered portion R4 of hole portion 25HC and located on the other side in axis direction AR, is perpendicular to axis direction AR. Hole portion 25HC has a shape that is bilaterally asymmetrical with respect to the central axis (see central axis CT in FIG. 9) located inside hole portion 25HC and extending in the direction orthogonal to axis direction AR.

Side wall portions 25H3 and 25H5 do not contribute to the movement of each of roller units 23A and 23B in axis direction AR relative to roller shaft 21S. This relative movement can be implemented mainly by side wall portion 25H2. The above-described configuration may be employed when the relative movement needs to have specific directionality. Also by the above-described configuration, engaging pins 21P and 21Q can be readily moved from wide-width portion R3 (release portion R2) toward restriction portion R1 with the help of side wall portion 25H2 and the like, so that roller units 23A and 23B can be readily switched from the disengaged state to the engaged state.

(Fourth Modification)

Figure 12:
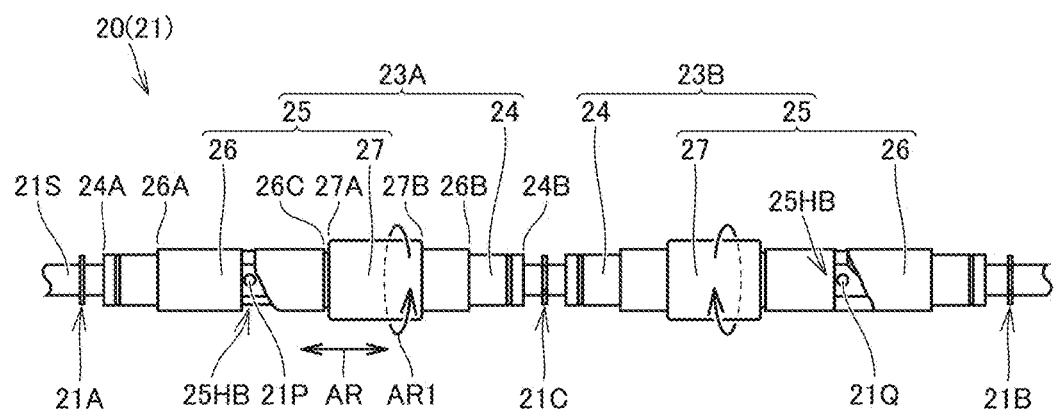
FIG. 12 is a plan view showing a loop roller mechanism 20 in the fourth modification of the first embodiment.

In loop roller mechanism 20 shown in FIG. 12, hole portion 25HB (FIG. 10) is provided in roller unit 23A while hole portion 25HB (FIG. 10) is also provided in roller unit 23B. Side wall portions 25H2 (the first portions) provided in roller units 23A and 23B are disposed on the same side of their respective hole portions 25HB in axis direction AR. Movement of each of roller units 23A and 23B relative to roller shaft 21S in axis direction AR is implemented mainly by side wall portion 25H3 (FIG. 10). The above-described configuration may be employed when the relative movement needs to have specific directionality. Also by the above-described configuration, engaging pins 21P and 21Q can be readily moved from wide-width portion R3 (release portion R2) toward restriction portion R1 with the help of side wall portion 25H3 and the like, so that roller units 23A and 23B can be readily switched from the disengaged state to the engaged state.

(Fifth Modification)

Figure 13:
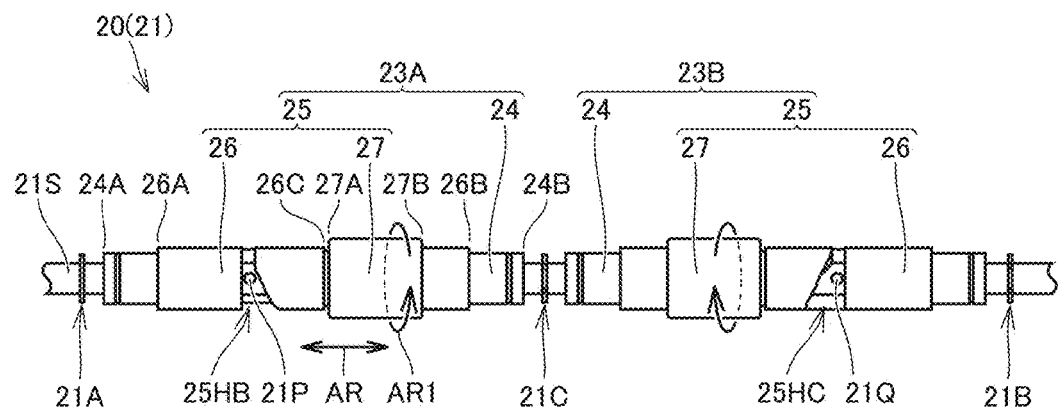
FIG. 13 is a plan view showing a loop roller mechanism 20 in the fifth modification of the first embodiment.

In loop roller mechanism 20 shown in FIG. 13, hole portion 25HB (FIG. 10) is provided in roller unit 23A while hole portion 25HC (FIG. 11) is provided in roller unit 23B. Side wall portion 25H2 (the first portion) provided in roller unit 23A is disposed on one side in hole portion 25HB of roller unit 23A in axis direction AR. Also, side wall portion 25H3 (the first portion) provided in roller unit 23B is disposed on the other side in hole portion 25HC of roller unit 23B in axis direction AR. Movement of roller unit 23A relative to roller shaft 21S in axis direction AR is implemented mainly by side wall portion 25H3 (FIG. 10). Movement of roller unit 23B relative to roller shaft 21S in axis direction AR is implemented mainly by side wall portion 25H2 (FIG. 11). The above-described configuration may be employed when each of these relative movements needs to have specific directionality. Also by the above-described configuration, engaging pins 21P and 21Q can be readily moved from wide-width portion R3 (release portion R2) toward restriction portion R1 with the help of side wall portion 25H3 and the like, so that roller units 23A and 23B can be readily switched from the disengaged state to the engaged state.

(Sixth Modification)

Figure 14:
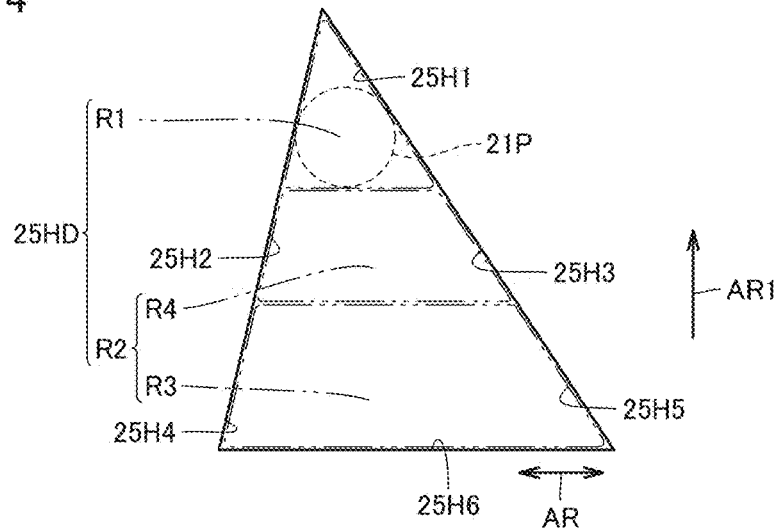
FIG. 14 is a diagram schematically showing a hole portion 25HD provided in a roller holding portion 26 in the sixth modification of the first embodiment (showing hole portion 25HD developed in paper conveying direction AR1).

FIG. 14 is a diagram schematically showing a hole portion 25HD provided in roller holding portion 26 in the sixth modification of the first embodiment (showing hole portion 25HD developed in paper conveying direction AR1). Hole portion 25HD is different from hole portion 25H (FIG. 8) in the first embodiment in that it has a triangular shape. Hole portion 25HD has a shape that is bilaterally asymmetrical with respect to the central axis (see central axis CT in FIG. 9) located inside hole portion 25HD and extending in the direction orthogonal to axis direction AR. Also by the above-described configuration, the functions and effects approximately similar to those in the above-described first embodiment can be achieved.

(Seventh Modification)

Figure 15:
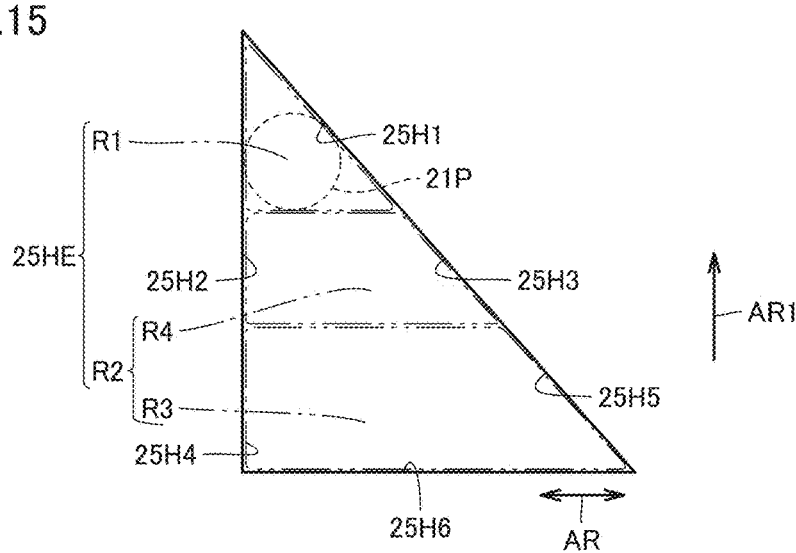
FIG. 15 is a diagram schematically showing a hole portion 25HE provided in a roller holding portion 26 in the seventh modification of the first embodiment (showing hole portion 25HE developed in paper conveying direction AR1).

FIG. 15 is a diagram schematically showing a hole portion 25HE provided in roller holding portion 26 in the seventh modification of the first embodiment (showing hole portion 25HE developed in paper conveying direction AR1). Hole portion 25HE is different from hole portion 25H (FIG. 8) in the first embodiment in that it has a right-angled triangular shape. Hole portion 25HE has a shape that is bilaterally asymmetrical with respect to the central axis (see central axis CT in FIG. 9) located inside hole portion 25HE and extending in the direction orthogonal to axis direction AR. Side wall portions 25H2 and 25H4 each extend in the direction orthogonal to axis direction AR. Also by the above-described configuration, the functions and effects approximately similar to those in the above-described first embodiment can be achieved.

(Eighth Modification)

Figure 16:
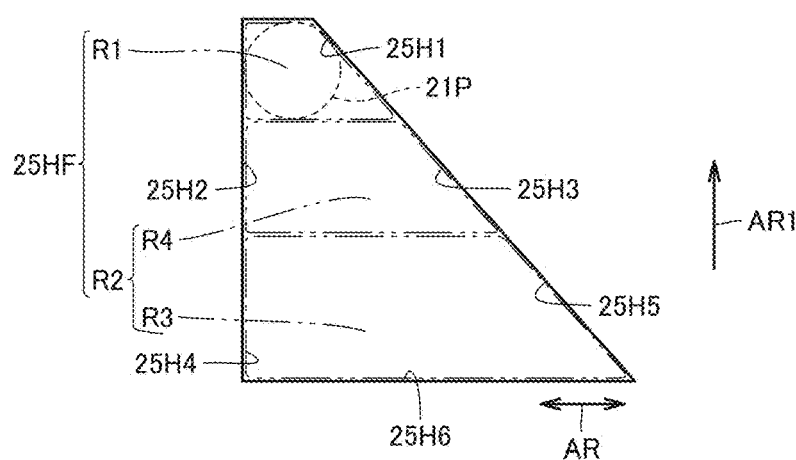
FIG. 16 is a diagram schematically showing a hole portion 25HF provided in a roller holding portion 26 in the eighth modification of the first embodiment (showing hole portion 25HF developed in paper conveying direction AR1).

FIG. 16 is a diagram schematically showing a hole portion 25HF provided in roller holding portion 26 in the eighth modification of the first embodiment (showing hole portion 25HF developed in paper conveying direction AR1). Hole portion 25HF is different from hole portion 25H (FIG. 8) in the first embodiment in that it has a trapezoidal shape. Hole portion 25HF has a shape that is bilaterally asymmetrical with respect to the central axis (see central axis CT in FIG. 9) located inside hole portion 25HF and extending in the direction orthogonal to axis direction AR. Side wall portions 25H2 and 25H4 each extend in the direction orthogonal to axis direction AR. Also by the above-described configuration, the functions and effects approximately similar to those in the above-described first embodiment can be achieved.

(Ninth Modification)

Figure 17:
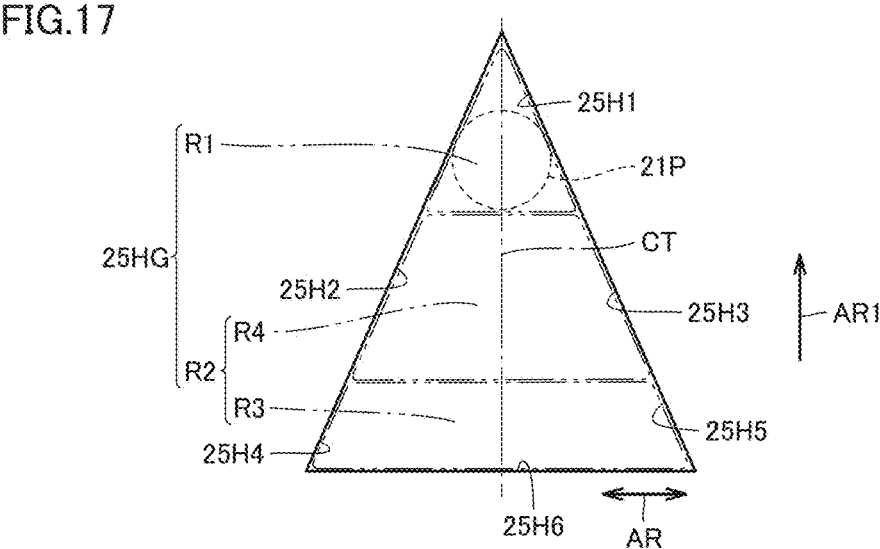
FIG. 17 is a diagram schematically showing a hole portion 25HG provided in a roller holding portion 26 in the ninth modification of the first embodiment (showing hole portion 25HG developed in paper conveying direction AR1).

FIG. 17 is a diagram schematically showing a hole portion 25HG provided in roller holding portion 26 in the ninth modification of the first embodiment (showing hole portion 25HG developed in paper conveying direction AR1). Hole portion 25HG is different from hole portion 25H (FIG. 8) in the first embodiment in that it has a isosceles triangular shape. Hole portion 25HG has a shape that is bilaterally symmetrical with respect to central axis CT located inside hole portion 25HG and extending in the direction orthogonal to axis direction AR. Also by the above-described configuration, the functions and effects approximately similar to those in the above-described first embodiment can be achieved.

(Tenth Modification)

Figure 18:
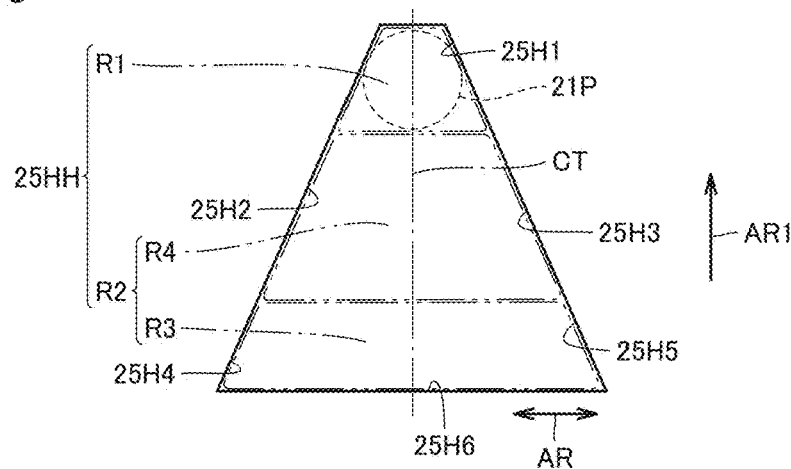
FIG. 18 is a diagram schematically showing a hole portion 25HH provided in a roller holding portion 26 in the tenth modification of the first embodiment (showing hole portion 25HH developed in paper conveying direction AR1).

FIG. 18 is a diagram schematically showing a hole portion 25HH provided in roller holding portion 26 in the tenth modification of the first embodiment (showing hole portion 25HH developed in paper conveying direction AR1). Hole portion 25HH is different from hole portion 25H (FIG. 8) in the first embodiment in that it has a trapezoidal shape. Hole portion 25HH has a shape that is bilaterally symmetrical with respect to central axis CT located inside hole portion 25HH and extending in the direction orthogonal to axis direction AR. Also by the above-described configuration, the functions and effects approximately similar to those in the above-described first embodiment can be achieved.

(Eleventh Modification)

Figure 19:
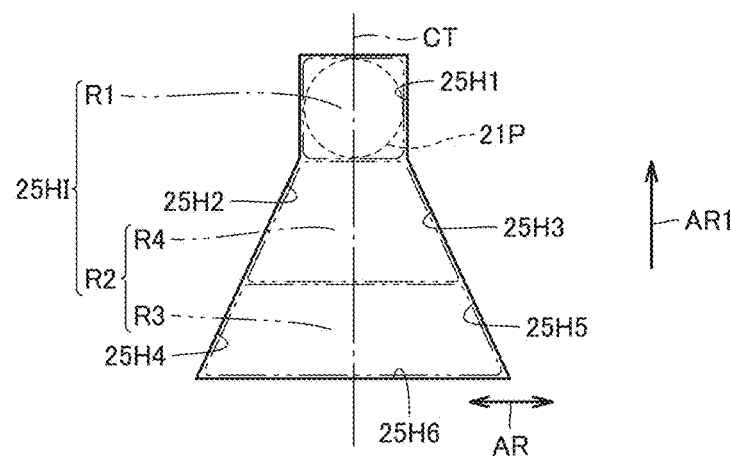
FIG. 19 is a diagram schematically showing a hole portion 25HI provided in a roller holding portion 26 in the eleventh modification of the first embodiment (showing hole portion 25HI developed in paper conveying direction AR1).

FIG. 19 is a diagram schematically showing a hole portion 25HI provided in roller holding portion 26 in the eleventh modification of the first embodiment (showing hole portion 25HI developed in paper conveying direction AR1). Hole portion 25HI is different from hole portion 25H (FIG. 8) in the first embodiment in that side wall portions 25H4 and 25H5 extend such that the distance between side wall portions 25H4 and 25H5 in axis direction AR is gradually narrowed from bottom portion 25H6 toward tapered portion R4. Hole portion 25HI has a shape that is bilaterally symmetrical with respect to central axis CT located inside hole portion 25HI and extending in the direction orthogonal to axis direction AR. Also by the above-described configuration, the functions and effects approximately similar to those in the above-described first embodiment can be achieved.

Second Embodiment

Referring to FIG. 20 to FIG. 23, a paper conveying device in the second embodiment will be hereinafter described. The first embodiment is different from the second embodiment in the configuration of the roller shaft and the roller unit that are used in loop roller mechanism 20 (roller body 21).

Figure 20:
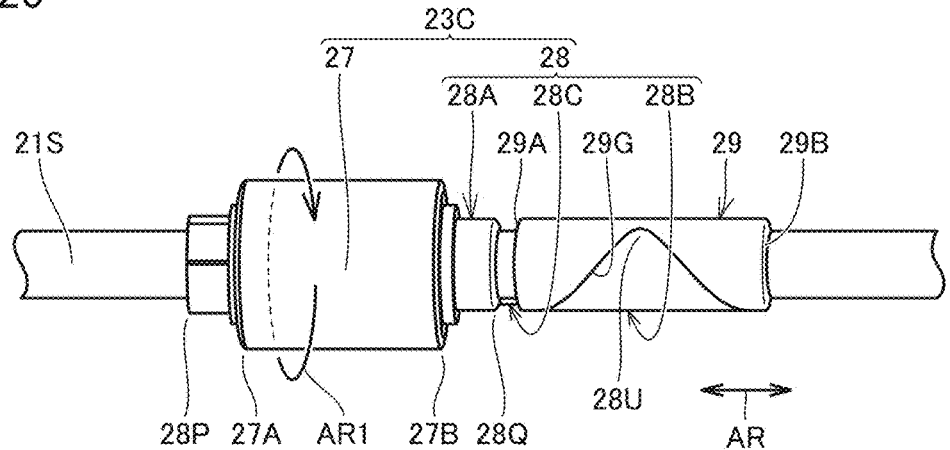
FIG. 20 is a perspective view showing a roller shaft 21S and a roller unit 23C that are provided in a paper conveying device in the second embodiment, which shows the manner in which roller unit 23C is in the engaged state.
Figure 21:
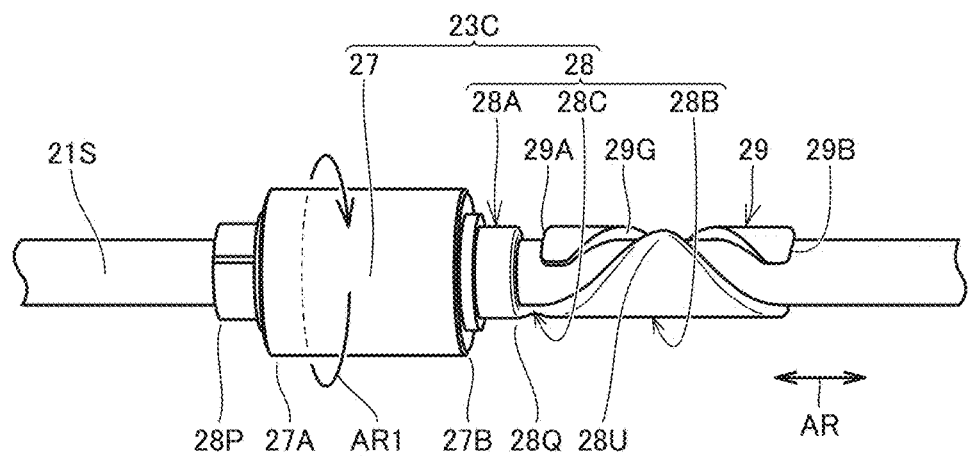
FIG. 21 is a perspective view showing roller shaft 21S and roller unit 23C that are provided in the paper conveying device in the second embodiment, which shows the manner in which roller unit 23C is in the disengaged state.
Figure 22:
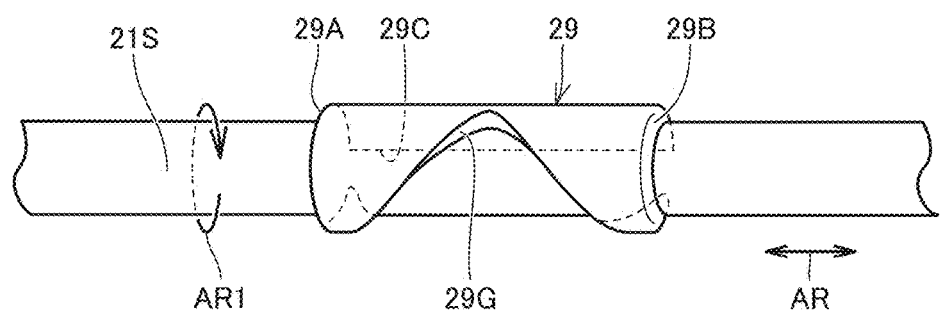
FIG. 22 is a perspective view showing roller shaft 21S provided in the paper conveying device in the second embodiment.
Figure 23:
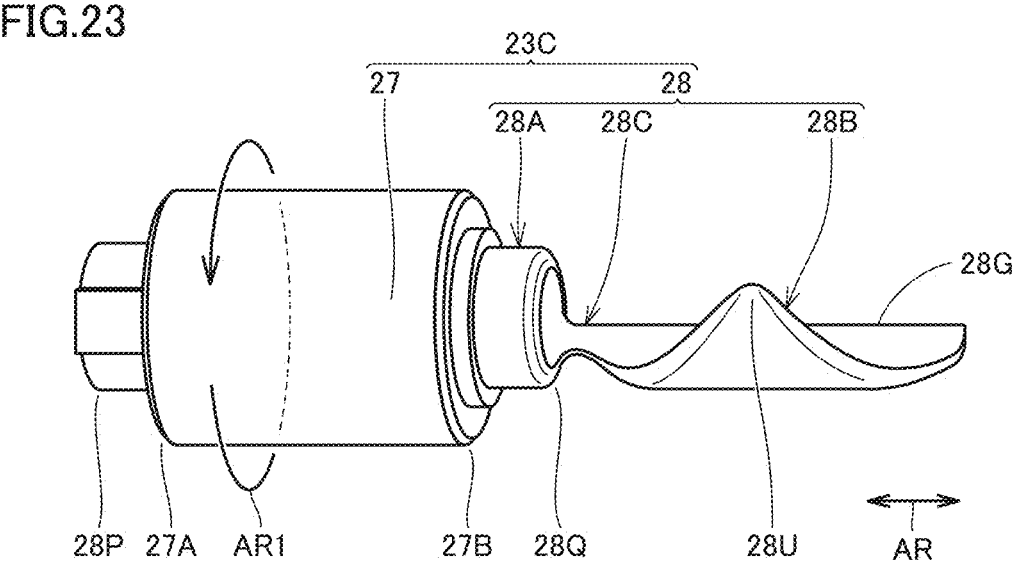
FIG. 23 is a perspective view showing roller unit 23C provided in the paper conveying device in the second embodiment.

FIG. 20 is a perspective view showing roller shaft 21S and a roller unit 23C that are included in a paper conveying device in the second embodiment, which shows the manner in which roller unit 23C is in the engaged state. FIG. 21 is a perspective view showing roller shaft 21S and roller unit 23C that are included in the paper conveying device in the second embodiment, which shows the manner in which roller unit 23C is in the disengaged state. FIG. 22 and FIG. 23 are perspective views showing roller shaft 21S and roller unit 23C, respectively.

(Roller Shaft 21S and First Engaging Portion)

Referring to FIG. 20 to FIG. 22 (mainly FIG. 22), roller shaft 21S has a columnar shape extending in axis direction AR. Roller shaft 21S is made of metal, for example. Roller shaft 21S is provided with bearings (not shown) at its one end and other positions. Roller shaft 21S is rotatably supported by these bearings.

Roller shaft 21S has a large-diameter portion 29 (FIG. 22) and rotates integrally with large-diameter portion 29. Large-diameter portion 29 has a shape protruding radially outward from the surface of roller shaft 21S. Large-diameter portion 29 includes an end 29A located at one end in axis direction AR and an end 29B located at the other end in axis direction AR. Large-diameter portion 29 has a concave portion 29G as the first engaging portion that is located between ends 29A and 29B. Large-diameter portion 29 has a contact surface 29C on the opposite side of concave portion 29G with respect to paper conveying direction AR1. Contact surface 29C has a shape extending in the direction parallel with axis direction AR.

(Roller Unit 23C and Second Engaging Portion)

Referring to FIG. 20, FIG. 21 and FIG. 23 (mainly FIG. 23), roller unit 23C is a member having the second engaging portion (a convex portion 28U), which will be described later. Roller unit 23C is provided on roller shaft 21S so as to surround roller shaft 21S in the circumferential direction. Roller unit 23C conveys sheet of paper P as roller unit 23C rotates while being in contact with sheet of paper P fed onto paper conveying path Q (specifically, while conveying roller 27 is in contact with sheet of paper P).

Roller unit 23C in the present embodiment includes a conveying roller 27 and a roller holding portion 28. Roller unit 23C is made of a resin, for example. Roller holding portion 28 includes a cylindrical portion 28A, a curved plate portion 28B, and a connection portion 28C. Cylindrical portion 28A includes an end 28P located at one end in axis direction AR and an end 28Q located at the other end in axis direction AR. Cylindrical portion 28A is disposed to surround roller shaft 21S in the circumferential direction and to slide along roller shaft 21S.

Curved plate portion 28B is adjacent to cylindrical portion 28A in axis direction AR. Connection portion 28C is provided so as to connect curved plate portion 28B and cylindrical portion 28A. Curved plate portion 28B includes a convex portion 28U and a contact end portion 28G. Convex portion 28U is formed to extend in a convex shape (an approximately isosceles triangular shape) in the opposite direction to paper conveying direction AR1. Convex portion 28U can function as the second engaging portion. Curved plate portion 28B includes a contact end portion 28G on the side of convex portion 28U with respect to paper conveying direction AR1. Contact end portion 28G is shaped to extend in the direction parallel with axis direction AR.

Conveying roller 27 is formed to have a cylindrical shape and provided to surround the outer circumferential surface of cylindrical portion 28A of roller holding portion 28 in the circumferential direction. Conveying roller 27 is made of a resin, for example, and is formed to have a cylindrical shape extending from one end 27A to the other end 27B in axis direction AR.

(Engaged State)

Concave portion 29G (the first engaging portion) provided in roller shaft 21S and convex portion 28U (the second engaging portion) provided in roller unit 23C engage with each other, so that roller unit 23C is brought into the engaged state. In the engaged state (in the state shown in FIG. 20), concave portion 29G and convex portion 28U engage with each other in axis direction AR. When roller unit 23C is in the engaged state, roller unit 23C is restricted from moving in axis direction AR relative to roller shaft 21S.

Roller unit 23C is provided on roller shaft 21S so as to be rotatable relative to roller shaft 21S. When roller unit 23C is in the engaged state (in the state shown in FIG. 20), roller unit 23C is rotatable in paper conveying direction AR1 relative to roller shaft 21S. Also, convex portion 28U is in contact with concave portion 29G, so that roller unit 23C is restricted from rotating in the opposite direction to paper conveying direction AR1 relative to roller shaft 21S.

As in the first embodiment, when switching mechanism 41 (FIG. 3) is in the connected state, from driving source 40 (FIG. 3) that is drive-connected to roller shaft 21S, roller shaft 21S receives the driving force acting in the direction rotating in paper conveying direction AR1, so that roller shaft 21S can rotate in paper conveying direction AR1. When roller shaft 21S receives the driving force from driving source 40, concave portion 29G (the first engaging portion) and convex portion 28U (the second engaging portion) are in contact with each other. Then, by concave portion 29G, the force rotating in paper conveying direction AR1 is applied to convex portion 28U. Thereby, roller unit 23C is brought into the engaged state while roller shaft 21S rotates integrally with roller unit 23C.

(Disengaged State)

Concave portion 29G (the first engaging portion) provided in roller shaft 21S and convex portion 28U (the second engaging portion) provided in roller unit 23C are spaced apart from each other, so that roller unit 23C is brought into the disengaged state. In the disengaged state (in the state shown in FIG. 21), concave portion 29G and convex portion 28U do not engage with each other in axis direction AR. When roller unit 23C is in the disengaged state, roller unit 23C is rotatable in axis direction AR relative to roller shaft 21S.

When roller unit 23C is in the disengaged state (in the state shown in FIG. 21), concave portion 29G and convex portion 28U are spaced apart from each other in paper conveying direction AR1. Accordingly, roller unit 23C is rotatable in the opposite direction to paper conveying direction AR1 at least relative to roller shaft 21S. When roller unit 23C is in the disengaged state where contact end portion 28G is not in contact with contact surface 29C, roller unit 23C is rotatable relative to roller shaft 21S not only in the opposite direction to paper conveying direction AR1 but also in paper conveying direction AR1.

When roller unit 23C rotates in paper conveying direction AR1 relative to roller shaft 21S in the state where roller unit 23C is in the engaged state (FIG. 20), concave portion 29G (the first engaging portion) and convex portion 28U (the second engaging portion) are separated away from each other, so that roller unit 23C is brought into the disengaged state.

On the other hand, when roller unit 23C rotates in the opposite direction to paper conveying direction AR1 relative to roller shaft 21S in the state where roller unit 23C is in the disengaged state (FIG. 21), concave portion 29G (the first engaging portion) and convex portion 28U (the second engaging portion) come into contact with each other, so that roller unit 23C is brought into the engaged state.

When switching mechanism 41 (FIG. 3) is in the disconnected state, roller shaft 21S does not receive the driving force from driving source 40. Roller shaft 21S is rotatably held by bearings. Sheet of paper P is conveyed by the conveying force from resist roller mechanism 30 (FIG. 1) disposed on the downstream side of loop roller mechanism 20. While roller unit 23C (conveying roller 27) is in contact with sheet of paper P that is being conveyed, roller unit 23C is rotated in paper conveying direction AR1 relative to roller shaft 21S upon reception of the shear force from sheet of paper P. Since roller shaft 21S does not receive the driving force from driving source 40, convex portion 28U (the second engaging portion) is moved in the direction away from concave portion 29G (the first engaging portion). Thereby, roller unit 23C is brought into the disengaged state.

Even by roller unit 23C configured as described above, the functions and effects similar to those in the above-described first embodiment can be achieved. According to the paper conveying device including roller unit 23C as described above, in contrast to Japanese Laid-Open Patent Publication No. 2005-206338 and Japanese Laid-Open Patent Publication No. 2011-102184 mentioned at the beginning of this specification, the biasing force caused by a spring and the like is not applied to roller unit 23C. Without having to resist the biasing force caused by a spring and the like, roller unit 23C can be moved rapidly and readily with high followability and high conveyance accuracy in the direction in which the displacement amount of sheet of paper P is corrected. There is also no need to separately provide driving means for moving roller unit 23C, so that cost and space reduction can be achieved. By the simple configuration as compared with the conventional configuration, sheet of paper P can be moved in the direction orthogonal to the conveying direction of sheet of paper P.

Other Embodiments

Although image forming apparatus 100 (FIG. 1) described in each of the above embodiments is an electrophotographic-type image forming apparatus, the idea disclosed in each of the above embodiments is applicable also to other types of image forming apparatuses.

The paper conveying device described in each of the above embodiments is used in the state where it is disposed between paper feeding roller 9 and transferring device 6 (transfer portion). The idea disclosed in each of the above embodiments is not limited to such usage, but applicable also to an automatic document feeder (ADF) and a relay unit, or to a post-processing device connected at the downstream of the image forming apparatus for subjecting the sheet of paper having an image formed thereon to post-processing such as sheet-binding, punching and book-binding.

Although embodiments of the present invention have been described and illustrated in detail, the disclosed embodiments are made for purposes of illustration and example only and not limitation. The scope of the present invention should be interpreted by terms of the appended claims.

What is claimed is:

1. A paper conveying device comprising:
    a roller shaft having a first engaging portion and configured to rotate integrally with the first engaging portion, the first engaging portion comprising one of an engaging pin and a concave portion; and
    a roller unit having a second engaging portion and provided on the roller shaft so as to surround the roller shaft in a circumferential direction of the roller shaft, the roller unit being configured to convey a sheet of paper as the roller unit rotates while being in contact with the sheet of paper fed onto a paper conveying path, the second engaging portion comprising one of a concave portion and a convex portion,
    the roller unit being configured to be restricted from moving in an axis direction relative to the roller shaft in an engaged state where the first engaging portion and the second engaging portion engage with each other,
    the roller unit being configured to be movable in the axis direction relative to the roller shaft in a disengaged state where the first engaging portion and the second engaging portion disengage from each other.

2. The paper conveying device according to claim 1, wherein
    the roller unit is provided on the roller shaft so as to be rotatable relative to the roller shaft,
    when the roller unit is in the engaged state, the roller unit is rotatable in a paper conveying direction relative to the roller shaft and is restricted from rotating in an opposite direction to the paper conveying direction relative to the roller shaft, and
    when the roller unit is in the disengaged state, the roller unit is rotatable in the opposite direction relative to the roller shaft.

3. The paper conveying device according to claim 2, wherein
    when the roller unit rotates in the paper conveying direction relative to the roller shaft in a state where the roller unit is in the engaged state, the first engaging portion and the second engaging portion are separated from each other to bring the roller unit into the disengaged state, and
    when the roller unit rotates in the opposite direction relative to the roller shaft in a state where the roller unit is in the disengaged state, the first engaging portion and the second engaging portion come into contact with each other to bring the roller unit into the engaged state.

4. The paper conveying device according to claim 3, wherein
    the roller shaft is rotatable as the roller shaft receives driving force acting in a direction in which the roller shaft rotates in the paper conveying direction, the driving force being transmitted from a driving source that is drive-connected to the roller shaft,
    when the roller shaft receives the driving force from the driving source, the first engaging portion and the second engaging portion come into contact with each other to bring the roller unit into the engaged state, and
    when the roller shaft does not receive the driving force from the driving source, the roller unit is rotated in the paper conveying direction by the sheet of paper that is being conveyed, and the first engaging portion and the second engaging portion are separated from each other to bring the roller unit into the disengaged state.

5. The paper conveying device according to claim 4, further comprising a switching mechanism configured to switch a connection state between: a connected state in which the driving force from the driving source is transmitted to the roller shaft; and a disconnected state in which the driving force from the driving source is not transmitted to the roller shaft.

6. The paper conveying device according to claim 2, wherein
    the roller unit includes
        a linear bearing disposed so as to surround the roller shaft in the circumferential direction and to slide along the roller shaft,
        a roller member provided on an outer circumferential surface of the linear bearing so as to surround the outer circumferential surface in the circumferential direction, the roller member being configured to rotate integrally with the linear bearing while being in contact with the sheet of paper, and
    the roller member is disposed so as not to be in contact with the roller shaft.

7. The paper conveying device according to claim 6, wherein
    the roller member includes
        a roller holding portion formed in a cylindrical shape, and
        a conveying roller provided on the roller holding portion,
    the first engaging portion has a shape protruding from a surface of the roller shaft,
    the roller holding portion is provided with a hole portion penetrating through the roller holding portion in a radial direction,
    the first engaging portion is disposed inside the hole portion,
    the hole portion includes
        a restriction portion, and
        a release portion formed adjacent to the restriction portion in the circumferential direction, the release portion being greater in opening width in the axis direction than the restriction portion,
    the first engaging portion is disposed inside the restriction portion to bring about the engaged state, and
    the first engaging portion is disposed inside the release portion to bring about the disengaged state.

8. The paper conveying device according to claim 7, wherein
    the release portion includes a wide-width portion and a tapered portion that is formed between the wide-width portion and the restriction portion in the circumferential direction, and the tapered portion is shaped such that an opening width of the tapered portion in the axis direction is gradually narrowed from the wide-width portion toward the restriction portion.

9. The paper conveying device according to claim 8, wherein
an inner wall forming the tapered portion of the hole portion includes
a first portion that is located on one side of the inner wall in the axis direction and not perpendicular to the axis direction, and
a second portion that is located on the other side of the inner wall in the axis direction and not perpendicular to the axis direction.

10. The paper conveying device according to claim 9, wherein the hole portion has a shape that is bilaterally asymmetrical with respect to a central axis, the central axis being located inside the hole portion and extending in a direction orthogonal to the axis direction.

11. The paper conveying device according to claim 8, wherein
an inner wall forming the tapered portion of the hole portion includes
a first portion that is located on one side of the inner wall in the axis direction and perpendicular to the axis direction, and
a second portion that is located on the other side of the inner wall in the axis direction and not perpendicular to the axis direction.

12. The paper conveying device according to claim 11, wherein
a plurality of the roller units are provided on the roller shaft, and
the first portion provided in each of the plurality of the roller units is located on a same side of the hole portion in the axis direction.

13. The paper conveying device according to claim 7, wherein the first engaging portion has a cylindrical shape or a columnar shape.

14. The paper conveying device according to claim 7, wherein the roller holding portion is formed of a member made of a resin.

15. The paper conveying device according to claim 1, wherein the roller unit is not provided with a mechanism for moving the roller unit in a direction away from the sheet of paper disposed on the paper conveying path.

16. The paper conveying device according to claim 1, wherein
a plurality of the roller units are provided on the roller shaft, and
the plurality of the roller units are rotatable relative to the roller shaft independently from each other.

17. The paper conveying device according to claim 1, wherein
a plurality of the roller units are provided on the roller shaft, and
when each of the plurality of the roller units is in the disengaged state, the plurality of the roller units are movable in the axis direction relative to the roller shaft independently from each other.

18. The paper conveying device according to claim 1, further comprising:
a resist roller mechanism positioned on a downstream side of the roller shaft on the paper conveying path;
a drive mechanism configured to drive the resist roller mechanism for conveyance of the sheet of paper;
a swing mechanism configured to move the resist roller mechanism in a direction orthogonal to a direction in which the sheet of paper is conveyed;
a sensor configured to sense a displacement amount of the sheet of paper disposed on the paper conveying path; and
a controller configured to drive the swing mechanism based on the displacement amount sensed by the sensor to move the resist roller mechanism in the direction orthogonal to the direction in which the sheet of paper is conveyed.

19. An image forming apparatus comprising the paper conveying device according to claim 1.

20. The paper conveying device according to claim 1, wherein the roller shaft is formed of a member made of metal.

* * * * *